United States Patent [19]

Beamon, III et al.

[11] Patent Number: 4,612,482

[45] Date of Patent: Sep. 16, 1986

[54] SPATIAL PIXEL OPTIMIZATION TECHNIQUE

[75] Inventors: William S. Beamon, III, Ormond Beach; Edward H. Tegge, Jr., Port Orange, both of Fla.

[73] Assignee: General Electric Company, Syracuse, N.Y.

[21] Appl. No.: 462,767

[22] Filed: Feb. 1, 1983

[51] Int. Cl.⁴ .................. H01J 29/56; H04N 5/14
[52] U.S. Cl. ................................. 315/371; 358/166
[58] Field of Search .............. 315/371; 358/68, 242, 358/152, 166

[56] References Cited

U.S. PATENT DOCUMENTS

| | | | |
|---|---|---|---|
| 2,143,933 | 1/1939 | Barthelemy | 178/7.5 |
| 2,222,934 | 11/1940 | Blumlein | 178/6.8 |
| 3,418,519 | 12/1968 | Ferrier et al. | 315/27 |
| 3,792,196 | 2/1974 | Wendland | 178/6.8 |
| 4,301,473 | 11/1981 | Wallace et al. | 358/166 |

OTHER PUBLICATIONS

Biberman, L. M., "Perception of Displayed Information", 1973 Plenum Press, New York-London, pp. 65 thru 75.
Beamon, W. S., Snyder, H. L., AMRL-TR-75-63 Aerospace Medical Research Laboratory, *An Experimental Evaluation of the Spot Wobble Method of Suppressing Raster Structure Visibility*, Nov. 1975, pp. 5 thru 23.
Snyder, H. L., Beamon, W. S., Gutmann, J. C., Dunsker, E. D., AMRL-TR-79-91, *An Evaluation of the Effect of Spot Wobble Upon Observer Performance with Raster Scan Displays*, Jan. 1980, pp. 9 thru 44.
Beamon, W. S., III, "*The Effects of Raster Structure Suppression on Visual Thresholds, Target Acquisition Performance, and Image Quality*", Dissertation submitted to Graduate Faculty of Virginia Polytechnic Inst., & State Univ., Jun. 1979, pp. 127–136.

*Primary Examiner*—Thomas H. Tarcza
*Assistant Examiner*—Gregory C. Issing
*Attorney, Agent, or Firm*—Richard V. Lang; Carl W. Baker

[57] ABSTRACT

The scan pattern of a raster scan video display system is modified to provide a sinusoidal raster scan, so that derived scan lines made up of pixels of adjacent scan lines are generated to enhance vertical scene resolution. A sinusoidal deflection circuit and microdeflection yoke produce the desired waveform, and a distortion compensation circuit corrects for distortions of the desired waveform.

9 Claims, 7 Drawing Figures

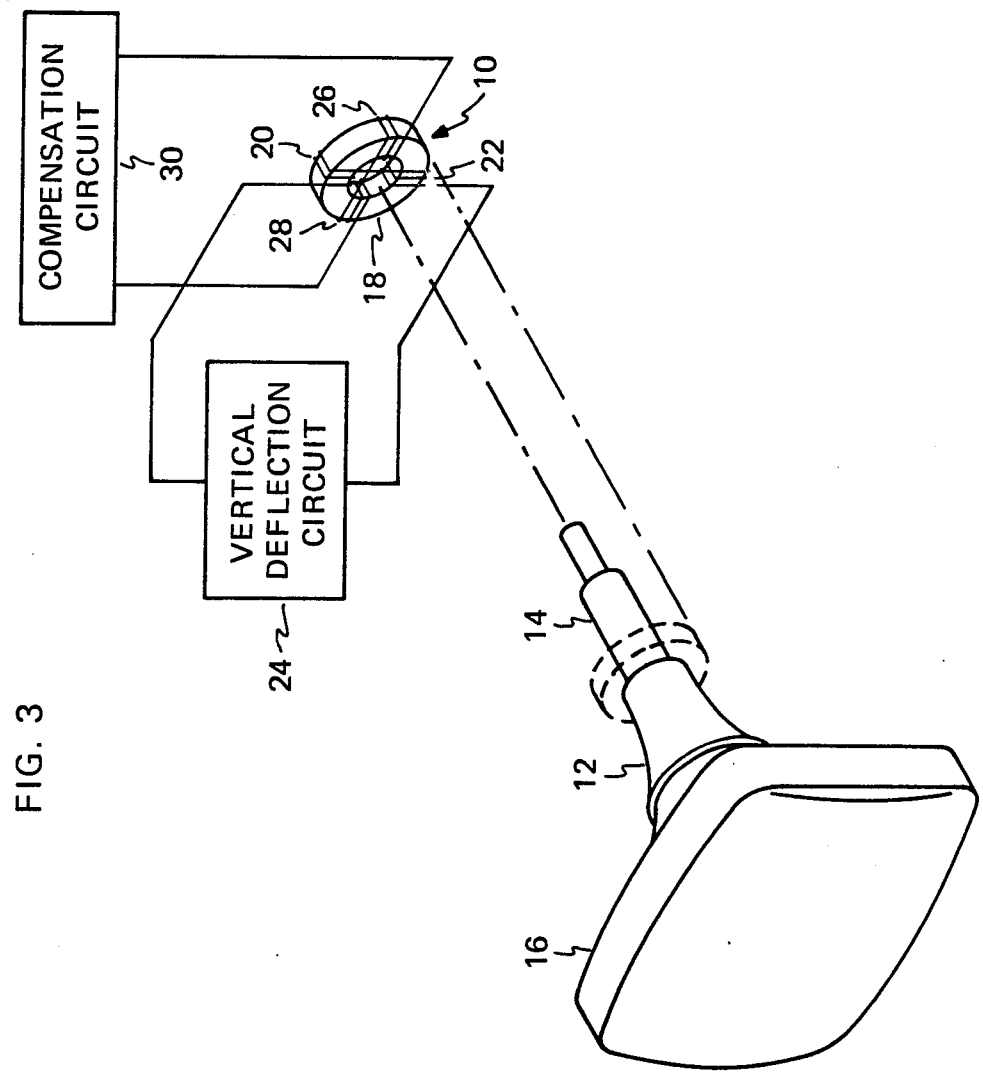

FIG. 7

| $V_{0,0}$ | | | | | | | | | | $V_{0,9}$ |
|---|---|---|---|---|---|---|---|---|---|---|
| 0,0 | 0,1 | 0,2 | 0,3 | 0,4 | 0,5 | 0,6 | 0,7 | 0,8 | 0,9 | |
| 1,0 | 1,1 | 1,2 | 1,3 | 1,4 | 1,5 | 1,6 | 1,7 | 1,8 | 1,9 | |
| 2,0 | 2,1 | 2,2 | 2,3 | 2,4 | 2,5 | 2,6 | 2,7 | 2,8 | 2,9 | |
| 3,0 | 3,1 | 3,2 | 3,3 | 3,4 | 3,5 | 3,6 | 3,7 | 3,8 | 3,9 | |
| 4,0 | 4,1 | 4,2 | 4,3 | 4,4 | 4,5 | 4,6 | 4,7 | 4,8 | 4,9 | |
| 5,0 | 5,1 | 5,2 | 5,3 | 5,4 | 5,5 | 5,6 | 5,7 | 5,8 | 5,9 | |
| 6,0 | 6,1 | 6,2 | 6,3 | 6,4 | 6,5 | 6,6 | 6,7 | 6,8 | 6,9 | |
| 7,0 | 7,1 | 7,2 | 7,3 | 7,4 | 7,5 | 7,6 | 7,7 | 7,8 | 7,9 | |
| 8,0 | 8,1 | 8,2 | 8,3 | 8,4 | 8,5 | 8,6 | 8,7 | 8,8 | 8,9 | |
| $V_{9,0}$ 9,0 | 9,1 | 9,2 | 9,3 | 9,4 | 9,5 | 9,6 | 9,7 | 9,8 | 9,9 | $V_{9,9}$ |

SPATIAL PIXEL OPTIMIZATION TECHNIQUE

BACKGROUND OF THE INVENTION

1. Field of the Invention

This invention relates to video display apparatus, and more particularly, to method and apparatus for improving the vertical resolution of computer generated full color or grayscale video imagery.

2. Description of the Prior Art

A number of techniques have been employed in the prior art to deflect the scanning spot for a raster display. In U.S. Pat. No. 2,222,934, issued Nov. 26, 1940 to Blumlein, a system for synchronous spot wobble for both a TV transmitter and a receiver is described. Each scan line of the display is deflected by a sinusoidal deflection voltage, so that a reduced size spot is scanned in a sinusoidal pattern within the line width on the display screen, to improve detail resolution by the raster scan system. U.S. Pat. No. 3,418,519, issued Dec. 24, 1968 to Ferrier et al, describes a CRT deflection technique for character generation in which high frequency waves are superimposed on horizontal and vertical deflection coils to generate characters of a predetermined character height. In U.S. Pat. No. 3,792,196, issued Feb. 12, 1974, to Wendland, a system for increasing the number of levels of brightness for a CRT and superimposing a vertical deflection pattern for video transmitting and receiving apparatus is described. The transmitter is scanned horizontally using a meander wave shape to deflect the transmitter scan into adjacent scan lines, and the scan pattern of the transmitter is duplicated at the receiver.

SUMMARY OF THE INVENTION

An object of the present invention is to provide a method and apparatus for vertically deflecting the scan line of a video image to improve the image quality.

A more particular object of the present invention is to provide a video control system to deflect the horizontal scan in a video display device to produce an additional vertical sinusoidal waveform to generate derived raster lines to enhance the scene detail in a full color or grayscale computer generated image.

Yet another object of the present invention is to provide a technique to provide derived raster lines formed by rows of displaced scene picture elements upon a video display device to enhance image resolution in the dimension normal to the scan lines and to improve image quality for a given raster scan rate.

Accordingly, the present invention includes a raster scan video image display system for displaying video information and an auxiliary deflection yoke connected to a control network supplying synchronized sinusoidal deflection signals thereto to modify the scan pattern of the video display device to follow a sinusoidal pattern during the scan of each raster scan line, and a compensation deflection coil on said auxiliary yoke connected to compensation circuitry to eliminate distortions in the sinusoidal scan pattern to produce a more realistic, higher quality video image. In a particularly preferred embodiment of the present invention, an auxiliary yoke is disposed about the neck of a CRT tube with a pair of vertical deflection coils disposed at opposite segments of the auxiliary yoke to produce a vertical deflection field and a pair of horizontal deflection coils disposed to produce a horizontal deflection field orthogonal to the vertical deflection field.

BRIEF DESCRIPTION OF THE DRAWINGS

The features of the invention believed to be novel and unobvious over the prior art are set forth with particularity in the appended claims. The invention itself, however, as to organization, method of operation and best mode contemplated by the inventors, together with further objects and advantages, may best be understood by reference to the following description taken in conjunction with the accompanying drawings, in which like reference characters refer to like elements throughout, and in which:

FIG. 3 is a schematic partial block diagram illustrating a deflection coil arrangement of the present invention;

FIG. 7 is a schematic diagram illustrating the arrangement of a video display screen into regions for distortion compensation.

DESCRIPTION OF THE PREFERRED EMBODIMENTS

For computer generated imagery to achieve a realistic appearance, one requirement is that straight lines in the displayed scene appear straight, when they intersect scan lines on the raster scan video display. This is especially important for dynamic scenes, in which the scene is made to appear as it would to an observer moving through the scene. The elements of the scene will appear to the observer to approach or recede, and as this occurs, the scene edges will often move across several successive scan lines of the video display apparatus. In the case of video image straight edge lines which intersect scan lines at very narrow angles, the image edge lines will tend to show discontinuities where they jump from one scan line to the next creating a stair step appearance. In a dynamic sequence the image lines will appear to "swim", i.e., move in a distracting wave pattern along the scan lines. In order to introduce a more realistic appearance to computer generated imagery for dynamic sequences, it is necessary to reduce the prominence of edge generated artifacts which appear when straight image lines intersect scan lines in the video image. In addition to the reduction of scan related artifacts, it is required that the display present sufficient resolution to depict scene details accurately to improve image quality and observer performance. In the present invention, derived raster lines are created to cause the discontinuities to occur at higher spatial frequencies to which the human eye is less sensitive compared to the frequencies of prior art systems. Furthermore the derived lines are created without requiring the generation of extra pixels per unit time.

Figure 1:
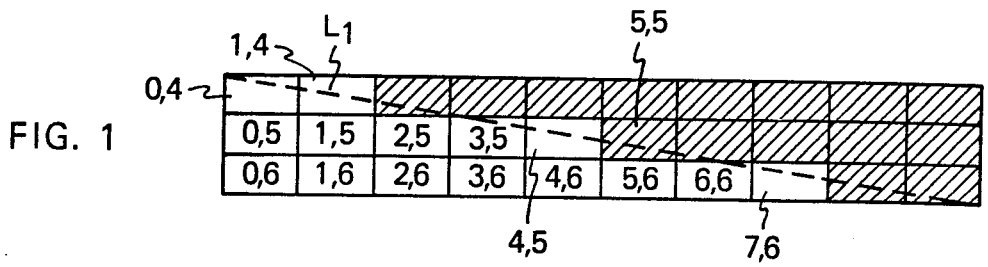
FIG. 1 is a diagram illustrating schematically the pixel scan pattern of a conventional CRT.

As shown in FIG. 1 the conventional scan pattern is of consecutive pixels in each raster scan line being painted in a horizontally adjacent position across the full scan line. These can be represented as having locations by horizontal line number and pixel number in the respective line as pixel 0,4; 1,4; etc., as shown. When a computer generated image includes a line or edge, shown by dashed line, $L_1$, which intersects a scan line at a narrow angle, the line appears to jump from one scan line, e.g., scan line 4, to the next, e.g., scan line 5, at the point along the image line where it intersects the transition space between scan line 4 and scan line 5. For example, the shaded area does not include pixel 4,5 but does include pixel 5,5. In a dynamic sequence this creates an observable "swimming" of the edge of the image, as the edge $L_1$ appears to move across the CRT image. This can create a severely distracting artifact, which must be eliminated to improve scene realism and training effectiveness of training equipment employing video display imaging, such as vehicle training equipment.

Figure 2:
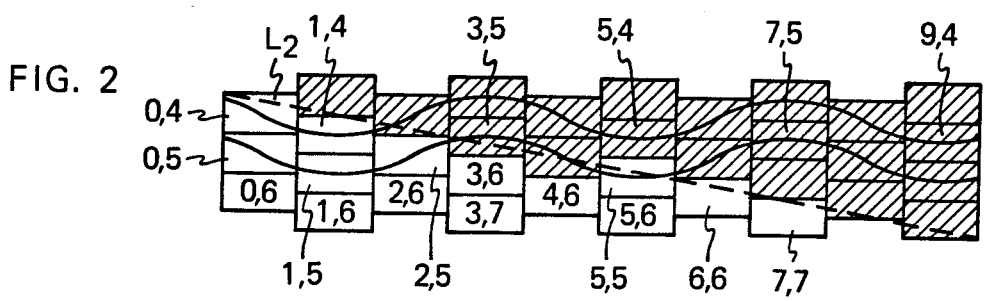
FIG. 2 is a diagram illustrating schematically a pixel scan pattern of a CRT controlled according to the present invention.

The present invention provides a sinusoidal microdeflection of the pixel pattern as it is scanned horizontally across a video display screen to reduce the discontinuities at image edges. FIG. 2 illustrates the raster scan pattern of the present invention. The first pixel, e.g., pixel 0,4 of the scan line is not deflected, since the sinusoidal deflection is synchronized with the scan to begin at a zero crossing. The second pixel, e.g., pixel 1,4 of the raster scan line 4 is offset vertically downwardly from the undeflected raster scan line position. The third pixel, e.g., pixel 2,4 is located at the undeflected pixel position, because the frequency of the sinusoidal deflection wave is chosen to be in synchronism with the pixel pattern, e.g., one quarter of the pixel rate, so that the third pixel is again located at a zero crossing of the sinusoidal waveform. The fourth pixel, e.g., pixel 3,4 is at the maximum amplitude of the sinusoidal waveform, and therefore has a maximum upward vertical deflection. The sinusoidal deflection waveform is then continued in synchronism with the pixel rate across the entire horizontal raster scan line. Each scan line is deflected in this sinusoidal pattern, which may be done according to the interlace pattern of a conventional CRT at the frame refresh rate of the CRT. As can be readily seen in FIG. 2, the downwardly deflected pixels, e.g., 1, 4; 5,4 and 9, 4 etc., of scan line 4 combined with the upwardly deflected pixels, e.g., 3,5; 7,5; etc., of the adjacent scan line 5 form a derived scan line offset ½ linewidth from the positions of the undeflected scan lines 4 and 5. In a display system employing an interlace pattern, the edge $L_2$ is composed of pixels from alternate fields, and flicker thus has a field rate rather than a frame rate component, and the perceived flicker of edge $L_2$ is reduced. Since the scan line is sinusoidal rather than straight, edge artifacts are composed of higher spatial frequencies to which the eye is less sensitive. Displayed pixels are sampled from the image generator's data base in synchronism with the scan in an analogous manner; i.e., the image generator produces display data for the pixels in the sinusoidal pattern. As is also apparent from FIG. 2, where image line $L_2$ intersects the raster lines the discontinuity is only ½ line width, so that a much less noticeable jump is required to accomplish the transition.

As illustrated schematically in FIG. 3, in a particularly preferred embodiment of the present invention, a deflection yoke 10 is installed behind the main deflection yoke 12 and concentric with the neck 14 of a CRT tube 16. The deflection yoke 10 includes a toroidal core 18 having oppositely wound vertical deflection coils 20 and 22 disposed on opposite sides of core 18 connected to vertical deflection circuit 24 and oppositely wound horizontal deflection coils 26, 28 on opposite sides of the toroid 10, centered 90° from the coils 20, 22 and connected to compensation circuit 30. This system superimposes a microdeflection waveform of a desired pattern, such as a sine wave, upon the scan pattern of the CRT raster to produce the scan pattern shown in FIG. 2. Use of the toroidal core 18, which completely surrounds the neck 14 of the CRT tube 16, causes the system to uniformly affect the convergence of the entire screen, making convergence compensation for color displays possible.

Figure 4:
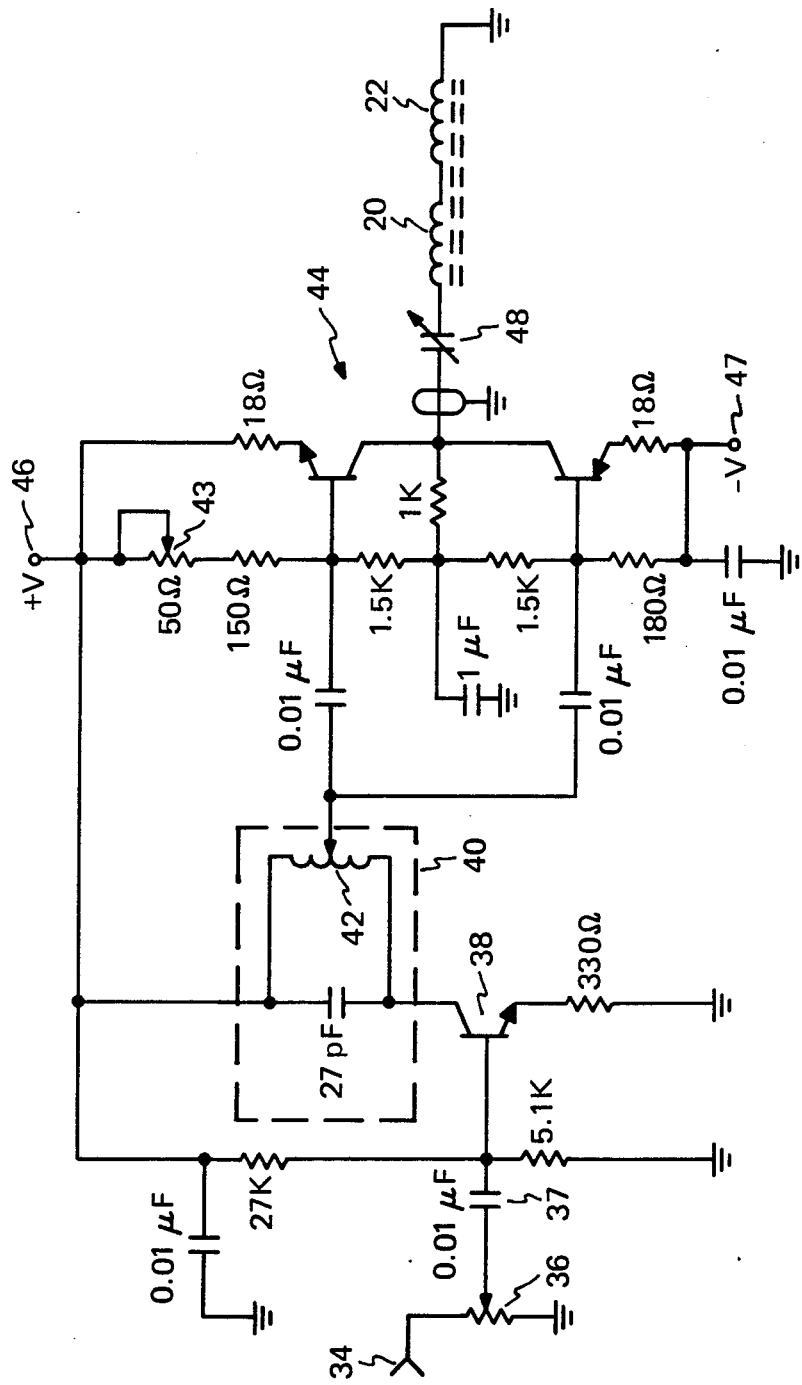
FIG. 4 is a schematic circuit diagram illustrating a sinusoidal deflection circuit of the present invention.

The vertical deflection circuit as shown in FIG. 4, receives an input 34 having a frequency of the pixel clock divided by four from a phase locked loop of conventional design (not shown) which is driven by a horizontal sync input or from the image generator pixel clock. The amplitude of this input signal 34 is adjusted by potentiometer 36 and coupled by capacitor 37 to amplifier 38 to obtain a sinusoidal signal from tuned transformer 40. The tapped output 42 from the transformer supplies a sinusoidal output to a push-pull amplifier 44 which provides a sinusoidal deflection signal to the tuned yoke windings 20 and 22. A pot 43 controls the bias point of the push-pull amplifier 44, so that the output can be controlled. The phase of the input is adjustable by the phase locked loop (not shown), so that the deflection voltage is exactly synchronized with the pixel clock divided by four. Therefore, the pixel deflection waveform is precisely controlled by the combination of pot 36, pot 43 and the controllable phase locked loop. The series capacitor 48 is adjustable, so that the windings 20 and 22 on the yoke can be series tuned, so that the deflection requires minimum drive power. As will be appreciated by those skilled in the art the particular resistor and capacitor values shown in FIG. 4 are illustrative of but one particular arrangement of the present invention, and many other sets of element values can be used in a network to perform the functions required by the present invention.

The application of a sinusoidal deflection signal to the raster scan causes a vertical deflection of the raster. However, in order to produce precise, uniform derived raster lines as shown in FIG. 2, a precise, uniform deflection of the pixels along the full length of the scan line is required. Therefore, compensation must be provided for any nonuniformities in the CRT, the raster drive circuits and the main deflection yoke. The present invention provides distortion compensation by adding horizontal deflection coils 26 and 28 to the yoke 10 with a drive circuit designed to induce a current in the horizontal deflection coils which corrects for any distortion of the scan waveform. As shown schematically in FIG. 5 the horizontal deflection circuit includes signal conditioning circuit 50 to set the phase delay and signal conditioning circuit 52 to set the symmetry of the input waveform, so that a proper square wave input is provided to the horizontal deflection circuit transistors $Q_1$ and $Q_4$ in sync with the pixel clock. The balance point on the balanced amplifier comprising transistors $Q_3$ and $Q_2$ is set by adjusting the bias resistor circuit 56, so that with no compensation voltage input from the sync locked function generator 60, described below, no output is supplied to the horizontal compensation windings 26, 28.

Figure 5:
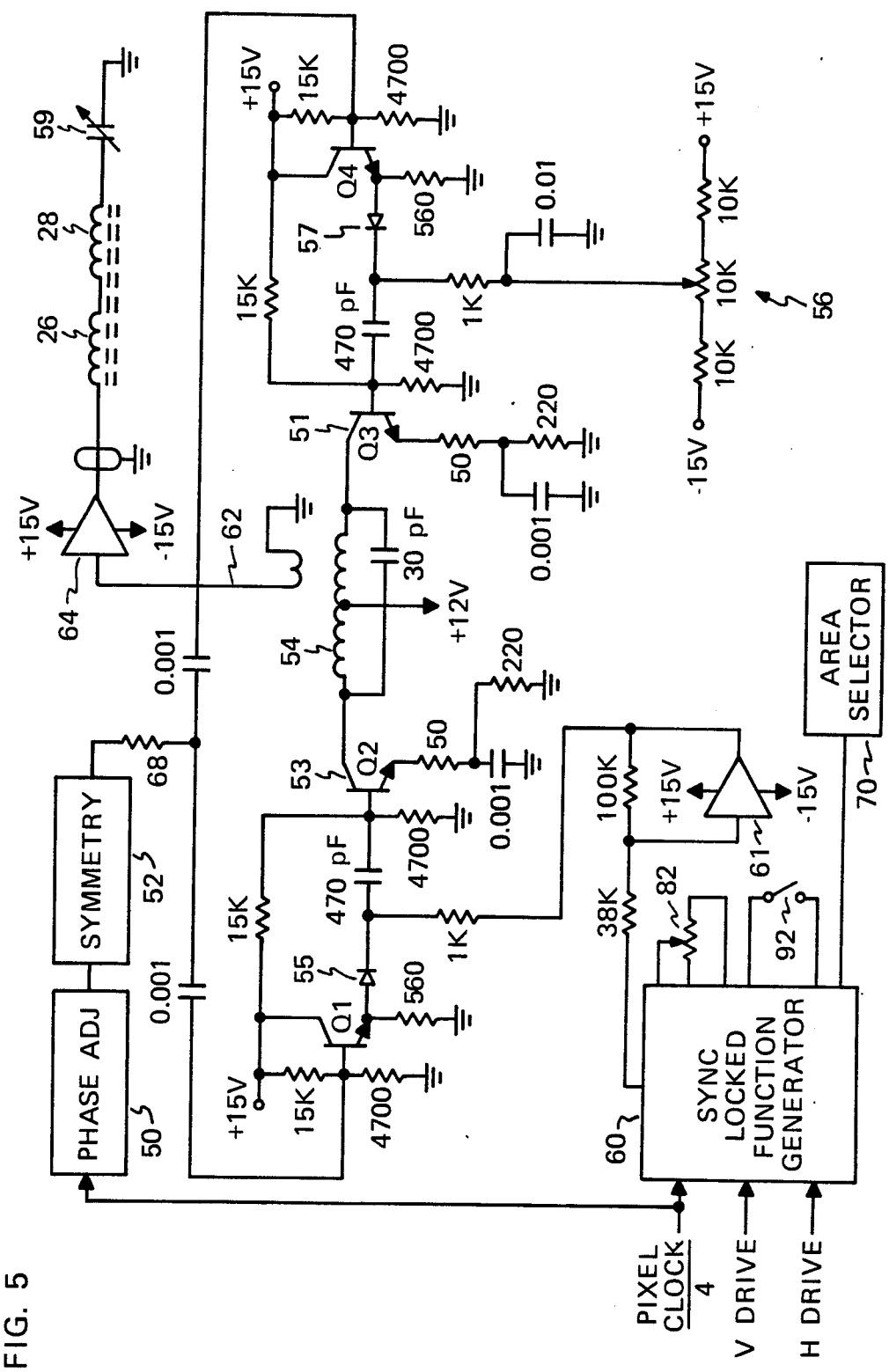
FIG. 5 is a schematic circuit diagram illustrating a distortion compensation feed network of the present invention.

The sync locked function generator 60 provides an output voltage signal to output driver 61, which provides a control voltage signal to diode 55. This control voltage changes the bias of diode 55, which allows more or less of the input signal from transistor $Q_1$ to pass. Changing the output of diode 55 causes a change of phase and amplitude of the compensation output signal 62, which is input to an adjustable gain output driver 64 to supply a distortion correction signal to the tuned horizontal deflection coils 26 and 28. If the output of the balanced amplifier is zero, no compensation signal is transmitted to the amplifier 64, and no correction signal is provided to coils 26 and 28. If a signal is provided by SLFG 60 via driver 61, the balanced amplifier will be unbalanced, a current will flow in transformer 54, and a distortion correction signal will be provided via amplifier 64 to coils 26, 28. The phase of the compensation signal 62 is switched between two states 180° apart by the output from diode 55. When an output signal is supplied by driver 61, the diode 55 is turned on, and the phase of the output signal 62 is switched from that of the input to transistor 51 to that of the input to transistor 53. The amplitude of the compensation signal 62 is controlled by the difference in amplitude of the signals from transistors 51 and 53 to the adjustable transformer 54. A positive output by driver 61 causes a change in voltage applied to transformer 54, which, in turn, causes a shift of the sinusoidal waveform in one horizontal direction and a negative output by driver 61 causes a shift of the sinusoidal waveform in the opposite direction. Therefore, both the phase and the amplitude of the distortion correction signal are controlled by the output from the sync locked function generator 60. It will be appreciated that the resistance and capacitance values shown in FIG. 5 are exemplary only, and many other combinations of particular circuit element values can be used to supply the same functions.

Figure 6:
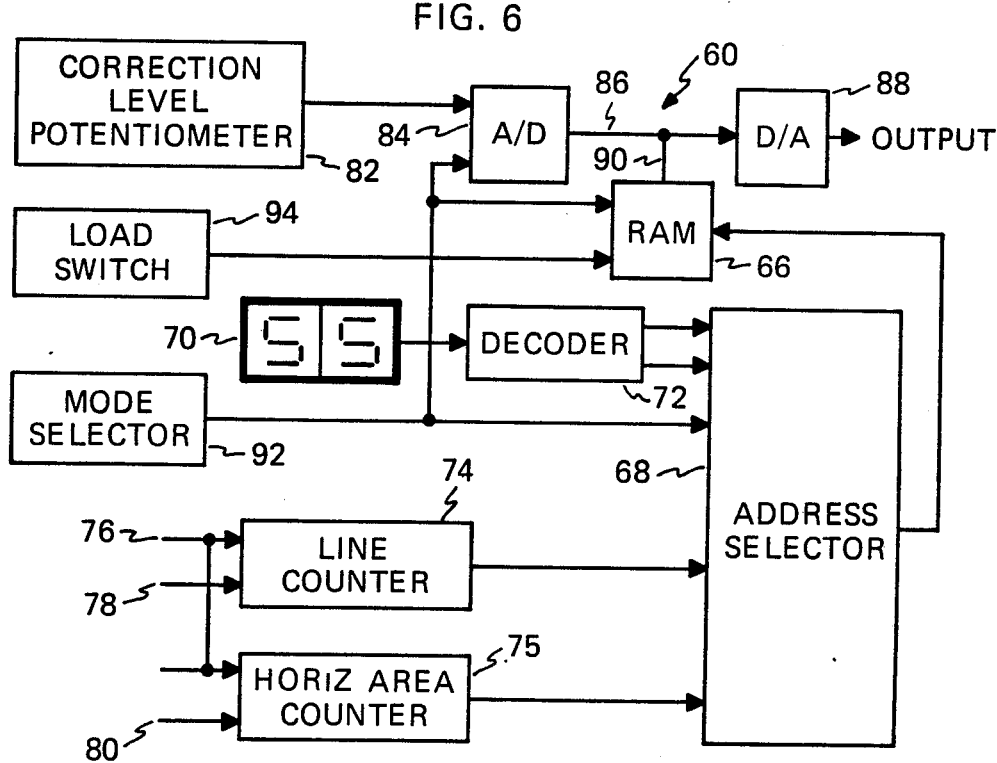
FIG. 6 is a functional block diagram illustrating the functions performed by the sync locked function generator of the present invention.

The SLFG 60 as shown in FIG. 6 provides as an output an analog control voltage to adjust the output of the balanced amplifier. SLFG 60 includes a random access memory 66 for storing correction levels. An address selector 68 controls the data location within RAM 66 accessed for either entry or read out of correction level data. A manually controlled area selector switch 70 allows operator selection of the video screen area to be corrected, and decoder 72 translates the area location into RAM addresses corresponding to the coordinates of a screen region. The address selector 68 receives inputs from a line counter 74, which receives horizontal sync input 76 and vertical sync input 78 from the image generator (not shown), and a horizontal area counter 75, which receives horizontal sync input 76 and pixel clock divided by four input 80. A manually controllable correction level potentiometer 82 supplies a DC voltage to the analog to digital converter 84, which can supply an output signal 86 directly to the output digital to analog converter 88 for immediate output to the display or supply a digital correction level to the RAM via bidirectional bus 90 for storage and later retrieval.

The generation and storage of the correction signals is accomplished dynamically, i.e., when the vertical deflection system is operating, so that the distortion compensation signal corrects for all distortion of the sinusoidal deflection signal, whether the distortion is caused by the vertical deflection hardware, the ramp sweep signal inputs, or the display system itself. As shown in the block diagram in FIG. 6, the SLFG 60 is switched to its setup mode by manually controlled selector switch 92 to accomplish a correction signal generation and storage. With mode selector switch 92 set to set-up, the A/D converter 84 and RAM 66 are set to the set-up mode. The manually controlled area selector switch 70 can be used to select a region of the screen by horizontal and vertical coordinates as shown in FIG. 7. Manually controllable potentiometer 82 sets a DC voltage level which is converted into digital format by A/D converter 84. D/A converter 88 converts the voltage back to analog format and provides an output to the output driver 61, FIG. 5, which controls the distortion compensation signal supplied to windings 26 and 28. The potentiometer 82 is adjusted until the selected region of the CRT is free of any visible distortion. The correction signal necessary to eliminate the distortion in the selected region is written via bidirectional bus 90 into the RAM 66 in digital format at the area address (row, column) corresponding to the CRT region selected as indicated by the address selector 68 by momentarily putting manually controllable load switch 94 into its load position. This process is repeated for all of the CRT regions, so that after this setup procedure is completed, the RAM 66 contains a precise correction signal required to produce a clean, distortion free spot wobbled raster over the entire CRT display.

To accomplish the correction, the display is divided into a number of regions, for example, 100 as shown in FIG. 7. When the SLFG 60 is set in its run mode of operation, it automatically outputs the correction levels stored in the RAM in synchronism with the painting of the CRT raster. Synchronization is accomplished by using the counters 75, 74, which constantly monitor the raster's i, j, location from the pixel clock and horizontal sync inputs. The horizontal, i, counter is clocked by the raster pixel clock and is reset by the raster horizontal sync signal. The line, j, counter is clocked by the raster horizontal sync signal and is reset by the raster's vertical sync signal. Therefore, the region in which the raster is located is obtained by dividing the output of the i and j counters by the number of columns and rows, respectively, used to divide the video display into regions. The display location is then used to address the RAM 66, which outputs a correction signal in synchronism with the raster scan. For each region of a display a DC correction signal is stored in the RAM 66. As the raster scan apparatus paints the display screen, the counters 74 and 75 provide inputs to address selector 68 which translates the row and pixel numbers into an area address for accessing the RAM 66, so that the appropriate correction signal is retrieved from the RAM, converted by D/A converter 88 to analog format and output via output driver 61 to control the distortion correction output signal supplied to windings 26 and 28.

As shown in FIG. 7, the horizontal correction signal amplitude varies with position on the screen. At the corner regions 0,0; 0,9; 9,0 and 9,9 the horizontal components of the compensation voltages are large as shown by the horizontal vectors, $V_{0,0}$, etc. At the center of the screen, i.e., regions 4,4; 4,5; 5,4 and 5,5 very little horizontal compensation voltage is required as shown by the absence of horizontal vectors in those regions. It is to be understood that the compensation pattern shown is exemplary only, and that whatever pattern is required can be provided by the compensation arrangement of the present invention. Therefore, the summation of all the distortions involved in a deflection system are eliminated by storing the proper correction signals in the RAM 66. It will be appreciated by those skilled in the art that the number of regions employed is an arbitrary choice by the operator based upon available hardware and the degree of correction required.

The present invention provides the spot wobble signal generating system with the capability of varying the horizontal deflection vector in either left or right direction with sufficient magnitude to eliminate distortion in each region of the video display. Furthermore, due to the large number of regions into which the screen is divided, the spot wobble raster distortion will be essentially eliminated over the entire face of the video display during the raster scan. As will be appreciated by those skilled in the art, the present invention can be applied to CRT or light valve video display systems which employ magnetic deflection systems. The creation of the derived raster lines allows a substantial improvement in vertical resolution while displaying the same number of pixels as in linear scan systems. Therefore, little additional processing of pixel information is required to achieve the display improvements, and the present invention provides a substantial improvement in the image quality of video display systems at low cost.

We claim:

1. A video display system comprising:
  a raster scan means for displaying a pattern of picture elements in successive raster lines upon a display screen comprising
    (1) a toroidal cathode ray tube main deflection yoke for magnetically deflecting an electron beam directed toward the display screen of the CRT and
    (2) micro-deflection means comprising
      (i) an auxiliary yoke displaced concentrically with said main deflection yoke and consisting of a toroid of magnetic material disposed concentrically with the main toroidal deflection yoke;
      (ii) a pair of micro-deflection windings disposed about said toroid at circumferentially opposite positions and wound about said toroid in opposite directions, such that the magnetic fields produced by current flow through said micro-deflection windings are opposed so as to produce a flux which deflects the electron beam vertically within the neck of the CRT; said micro-deflection windings being series tuned to produce a series resonance at a predetermined frequency,
      (iii) distortion correction means comprising a pair of opposed distortion compensation windings disposed about said toroid at circumferentially opposite positions located between said micro-deflection windings and wound about said toroid in opposite directions, such that the magnetic fields produced by current flow through said distortion compensation windings are opposed, and oriented orthogonally to the field of the micro-deflection windings so as to produce a flux which deflects the electron beam horizontally within the neck of the CRT; said distortion compensation windings being series tuned to produce a series resonance at a predetermined frequency, and
    (3) means for supplying a sinusoidal deflection signal to said micro-deflection winding pair to superimpose a sinusoidal deflection pattern upon each raster line, said sinusoidal deflection pattern having a frequency of one fourth the pixel rate and a peak-to-peak amplitude equal to the spacing between adjacent lines such that the first pixel of each micro-deflection cycle is located at an undeflected position, a second pixel is located vertically downward offset from the line by one half the line spacing, a third pixel is located at an undeflected position, a fourth pixel is located vertically upward offset from the line by one half the line spacing, and each successive four pixel group duplicates the sinusoidal deflection pattern across the display screen, and
    (4) means for supplying a distortion compensation signal to said distortion compensation windings having values for each of a plurality of regions of said screen,
    (5) means for synchronizing said sinusoidal micro-deflection signal with the initiation of each raster scan, so that each sinusoidal raster scan line has the same phase at each horizontal position across the screen, and the pixels of consecutive scan lines form vertically aligned columns of pixels, such that the vertically downwardly offset pixels of a first raster scan line and the vertically upwardly offset pixels of an adjacent second raster scan line form a derived raster scan line.

2. The invention of claim 1 wherein said means for supplying said micro-deflection means comprises:
  a push-pull amplifier driven by a tapped/tuned transformer to yield an output signal comprising a sinusoidal waveform having a frequency equal to the pixel clock rate of the video display divided by four.

3. The invention of claim 2 wherein said means for supplying said distortion compensation signal further comprises:
  a balanced amplifier means connected to said compensation windings for providing a distortion correction signal from a balanced amplifier to said distortion compensation windings;
  a balance setting network means establishing a balance point for said balanced amplifier connected to one side of said amplifier; and
  a DC compensation voltage supply network means connected to the other side of said balanced amplifier for supplying compensation voltage signals to said balanced amplifier to provide horizontal drive signals to said compensation windings to eliminate distortions from the sinusoidal scan waveform displayed on said screen.

4. The innvention of claim 3 wherein said means for supplying said distortion compensation signal further comprises a sync locked function generator comprising:
  memory means for storing a compensation voltage value for each of a plurality of regions of said screen;
  address means for accessing said memory means in synchronism with the scan of said raster scan means; and
  output means for outputting said compensation voltage value for each of said plurality of regions from said memory means to said other side of said balanced amplifier.

5. The invention of claim 4 wherein said sync locked function generator further comprises:
  mode selector means for controlling the accessing of said memory means;

manually controllable area selector means for manually selecting one of said plurality of regions of said screen;

manually controllable correction level potentiometer means for setting a correction level for removing scan distortion from the raster scan in the region of said screen selected by said area selector means;

analog to digital converter means for converting said correction level to a digital value for storage in said memory means;

load switch means for controlling the loading of correction levels into said memory means; and digital to analog means for converting said digital values to respective analog compensation voltage signals for output to said other side of said balanced amplifier.

6. A method of controlling the scan of a video display system comprising:

deflecting successive pixels of each scan line of a raster scan video image by imposing a sinusoidal deflection current upon each of a pair of coils disposed upon a toroid of magnetic material surrounding the neck of a cathode ray tube to induce a sinusoidal deflection field upon the electron beam emitted by the cathode of said cathode ray tube to produce said sinusoidal pattern of said raster scan lines so that a first pixel of each said raster scan line is located at an undeflected position, a second pixel is located at a position offset vertically downwardly from the raster line by one-half the raster line width, a third pixel is located at an undeflected position, a fourth pixel is located at a position offset vertically upwardly from the raster line by one-half the raster line width, and each successive four pixel group duplicates the deflection pattern across the video display screen; and synchronizing said deflection current with the horizontal scan deflection to maintain said sinusoidal patterns in synchronism with each other, so that adjacent scan lines are intermeshed to produce derived raster scan lines offset from adjacent undeflected raster scan lines by one-half the raster scan line width.

7. The invention of claim 6 further comprising:

supplying a distortion compensation signal to a pair of coils disposed upon said toroid to induce a magnetic field orthogonal to said sinusoidal deflection field to correct for distortion of the deflection waveform; so that a uniform sinusoidal pattern is maintained in each of said raster scan lines.

8. The invention claim 7 wherein said step of supplying a distortion correction signal comprises:

storing a plurality of DC correction levels in a random access memory for respective regions of a display screen;

retrieving a respective one of said correction levels for each of said regions as a raster scan line is painted across said regions; and inputting said respective correction levels from said RAM to a balanced amplifier for outputting respective compensation signals to said compensation coils.

9. The invention of claim 8 further comprising:

manually selecting a region of said plurality of regions;

manually adjusting the level of said distortion compensation signal dynamically;

loading respective compensation values into said RAM for each region of said screen; and synchronizing read-out of values from said RAM with the raster scan.

* * * * *